Patented Aug. 20, 1940

2,211,837

UNITED STATES PATENT OFFICE 2,211,837

AQUEOUS IODINE SOLUTION

Robb V. Rice and George D. Beal, Pittsburgh, Pa., assignors to Gane and Ingram, Inc., New York, N. Y., a corporation of New York No Drawing. Application June 20, 1939,
Serial No. 280,057

8 Claims. (Cl. 167—70)

This invention pertains to pharmaceutical preparations, and more especially to antiseptic solutions of iodine adapted for surface application.

An object of the invention is to provide a new type of iodine solution which possesses the desirable qualities of existing solutions, such as tincture of iodine, as regards such factors as, antiseptic properties, low surface tension or ease of surface wetting and skin penetration, ease with which the active ingredient, iodine, is given up to the area treated and maintains the area sterile for prolonged intervals, as well as keeping qualities and desired low acidity of the solution, but one which, by dispensing with the use of alcohol as a solvent for the iodine, eliminates the irritating action of this constituent employed as a solvent in existing types of iodine solutions for the purposes aforesaid.

The new product of our invention comprises an aqueous solution of iodine, which makes use for the first time of the solubilizing action for dissolving the iodine in water, of the alkyl amine hydriodides including the alkyl diamine hydriodides, such as the dihydriodide of ethylene diamine, and more especially the hydroxyalkyl amine hydriodides, particularly triethanol amine hydriodide. Although iodine alone is almost insoluble in water, we have discovered that substantial amounts pass into aqueous solution upon addition thereto of compounds of the character aforesaid comprising the reaction product of hydriodic acid with alkylamines including the diamines and the hydroxyalkyl amines. In general primary, secondary and tertiary amines may be employed in which the alkyl groups contain preferably from two to six carbon atoms. The preferred hydroxyalkyl amines hydriodides are accordingly those represented by the formulas HO(CH₂)ₙNH₂.HI, [HO(CH₂)ₙ]₂NH.HI and [HO(CH₂)ₙ]₃N.HI, where $n$ is any integer from 2 to 6; triethanolamine hydriodide (HOCH₂CH₂)₃N.HI being particularly effective. With regard to the diamines, the dihydriodide of ethylene diamine

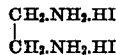

is preferred as above stated.

We have discovered that of the alkyl amines above referred to, iodine reacts directly with triethanolamine to form a white crystalline compound which is identical with the triethanolamine hydriodide obtained by treating triethanolamine with hydriodic acid; that the addition of iodine to this compound produces partial liquefaction and, in the presence of water, complete liquefaction of the iodine; and that, moreover, free iodine is appreciably soluble in water containing this iodine derivative, whereas pure iodine alone is, as above stated, almost insoluble in pure water.

Although the complete mechanism is not at present known to us by which triethanolamine and iodine react to form the hydriodide, it has been found that a portion of the triethanolamine which is present in excess during the preparation, is oxidized and furnishes hydrogen for the formation of the hydriodide. Triethanolamine and iodine react in the proportion of seven moles to three, respectively, and nearly six moles of triethanolamine hydriodide may be recovered from the reaction product. Therefore, practically all the iodine used is recovered in the triethanolamine hydriodide while one-seventh of the triethanolamine is oxidized to furnish hydrogen for the formation of hydrogen iodide. Furthermore, after all the triethanolamine hydriodide has been recovered from the reaction product, a residue remains which causes the reduction of Fehling's solution and thus gives a positive test for the presence of an aldehyde.

On the basis of this information it appears that the following reaction takes place:

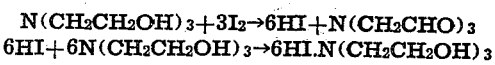

It is probable that the aldehyde which is formed as a result of the first reaction is not a stable compound and decomposes or reacts further in some unknown manner to form a more stable combination.

We have also observed that other hydroxyalkyl amines such as monoethanolamine, diethanolamine or tri-isopropanolamine will react with iodine or with hydriodic acid to give the corresponding hydroxyalkyl amine hydriodides and these products when placed in aqueous solution behave like triethanolamine hydriodide solutions in that appreciable amounts of iodine can be dissolved in them. However, they are not as generally useful in preparing aqueous iodine solutions for medicinal purposes as triethanolamine hydriodide, because they are obtained as liquids when prepared in the usual way and can be purified only with great difficulty. Of the diamines, the solubilizing action of the dihydriodide of ethylene diamine, is at least equal to that of triethanolamine.

Considering now the novel aspects of the invention, more particularly with reference to triethanolamine by way of example, the solubility of iodine in aqueous solution increases in nearly direct proportion with the triethanolamine hydriodide concentration up to a limit of about 4% or 0.0157 mole percent iodine at a concentration of about 30% or 0.1083 mole percent of the hydriodide, representing about the limit of solubility of the latter constituent in water. As shown hereinafter, however, aqueous solutions in accordance with the invention containing about 0.6 to 2% or 0.0024 to 0.0079 mole percent iodine, solubilized by the presence of about 2 to 15% or 0.007 to 0.054 mole percent of triethanolamine hydriodide, are ordinarily adequate as regards germicidal and other properties.

Although the alkylamine hydriodides referred to, as such were found to possess no germicidal properties, a 1% aqueous iodine-hydriodide solution in accordance with the invention, was found to kill *Staphylococcus aureus* and *Bacillus typhosus* in ten minutes. Or expressed differently, a solution according to the invention having an iodine concentration of one part in ten thousand, was active in killing these bacteria. By way of comparing the germicidal properties of solutions according to the invention with known types of iodine solutions in extensive use, 0.5 cc. of a twenty-four hour broth culture of *Staphylococcus aureus* (hemolytic and toxic form from a recent severe infection) was mixed with 5.0 cc. of a dilution of the iodine preparation being tested, this dilution being made by mixing one part of the original iodine solution with 99, 199, 299, etc., parts of sterile water. The culture was allowed to remain in contact with the diluted iodine preparation for ten minutes, then samples were transferred to sterile broth and incubated to allow growth of any surviving organisms. These tests were conducted on the following iodine solutions, viz.: Lugol's solution, U. S. P.; Karn's solution 3% iodine (see U. S. Patent No. 1,903,614); Tincture of iodine U. S. P.; triethanolamine hydriodide-iodine solutions, 1% iodine and 1.75% iodine, respectively. The results are summarized in Table I below where (—) indicates no growth and (+) indicates growth, in the broth tubes on subsequent incubation following the tests.

Table I

| Disinfectant | Dilution of disinfectants in 100's |||||||||| 
|---|---|---|---|---|---|---|---|---|---|---|
| | 1 | 2 | 3 | 4 | 5 | 6 | 7 | 8 | 9 | 10 |
| Lugol's solution, U. S. P. | — | — | — | — | — | + | + | + | + | + |
| Karns' solution, 3% I. | — | — | — | + | + | + | + | + | + | + |
| Tincture of iodine, U. S. P. | — | — | — | — | — | + | + | + | + | + |
| Triethanolamine hydriodide-iodine, 1% I. | + | + | + | + | — | — | — | — | — | — |
| Triethanolamine hydriodide-iodine, 1.75% I. | — | — | — | + | + | — | — | — | — | — |

These tests show that the germicidal activity in vitro is directly proportional to the free iodine content of the solution being tested. Although the other iodine solutions killed bacteria in higher dilutions than did those containing triethanolamine hydriodide and iodine, this is due to the higher percentage of iodine in the initial solution, and, hence, is no reason for preferring the former preparations for practical use. Since the latter solutions are active when diluted 100 times, it is obvious that application of the undiluted preparation will serve to render the area sterile.

The surface tension of an antiseptic solution plays an important role in its general efficacy. Solutions with high surface tensions penetrate skin pores very poorly and, especially on oily surfaces, will not wet uniformly if at all. Aqueous solutions are usually characterized by high surface tensions, water itself having one of the highest values of all liquids. It was found that by dissolving iodine in aqueous solutions of triethanolamine hydriodide, the surface tension was reduced from the value of 72 for pure water, to 53 dynes per centimeter. The following Table II compares the surface tensions of the various iodine solutions above referred to:

Table II

| Solution | Surface tension dynes per cm. |
|---|---|
| Water | 72.0 |
| Lugol's solution, U. S. P. | 71.5 |
| Karn's solution, 3% iodine | 52.2 |
| Triethanolamine hydriodide-iodine solution | 52.1 |
| Tincture of iodine, U. S. P. | 26.2 |

It is, therefore, apparent that while the solutions under investigation should penetrate skin pores somewhat better than water, they still will not enter as readily as tincture of iodine, which has a very low surface tension because of the alcohol used in it. Alcohol, on the other hand, is a poor medium of solution for antiseptics, principally because of its irritating properties when applied to sensitive membranes.

In order to obtain an aqueous solution with penetration properties approaching those of alcohol, several samples of aqueous iodine solutions were prepared which contained small amounts of surface-active agents known to reduce surface tension. The results are summarized in Table III below:

Table III

| Solution | Surface active agent | Surface tension dynes per cm. |
|---|---|---|
| Water | | 72 |
| Tincture of iodine, U. S. P. | | 26 |
| Triethanolamine hydriodide-iodine. | | 52 |
| Do | Tergitol-4 (0.5%) | 31 |
| Do | Gardinol-LS (0.5%) | 36 |
| Do | Gardinol-WA (0.5%) | 33 |
| Do | Aerosol-OT (0.2%) | 32 |

In the above table, Tergitol-4 is an aqueous solution of sodium salts of sulfated long chain secondary alcohols containing about ten to twenty carbon atoms in which the hydroxyl groups are located on carbon atoms near the center of the hydrocarbon chain (see U. S. Patent 2,088,019); the gardinols are of similar composition except that they are sodium salts of sulfated primary alcohols (see U. S. Patents 1,968,793-4-5-6 and 7); and Aerosol-OT is an ester of a sulfonated bicarboxylic acid (see U. S. Patent No. 2,038,091). All of these products are commercially available under the trade names indicated. Likewise, there are numerous other commercially available products of a similar character, known to reduce surface tension, which could be employed.

Any one of the surface-active agents used was found to produce approximately the same effect in the amount used, hence a choice of the most suitable one depended upon other factors. The Gardinols contain large amounts of impurities, principally sodium sulfate, and are somewhat difficult to handle. Aerosol-OT in the form employed did not give a clear solution. Therefore, Tergitol-4 was chosen as the best of the group. It serves to give a solution with a surface tension close to that of alcohol, thus making available an aqueous solution of iodine of high penetrating qualities, but which contains no irritating solvent.

Still another property of antiseptic solutions which has recently been shown to markedly affect their usefulness is the pH or acidity. Goldrich (J. Amer. Pharm. Assocn. 27, 1233-37 (1938)) found that germicidal activity is greatly increased in nearly all solutions which show any activity if the pH is brought below 4, i. e., to a point where the solution is definitely acid, but not to such an extent that any irritating effects to the skin are produced. Measurements of the pH of the various iodine solutions above referred to were carried out and found to be as follows:

Table IV

| Solution | pH value |
|---|---|
| Lugol's solution, U. S. P. | 7.50 |
| Tincture of iodine, U. S. P. | 6.50 |
| Karn's solution, 3% iodine | 2.90 |
| Triethanolamine hydriodide-iodine | 3.40 |

It may, therefore, be stated that the presence of triethanolamine hydriodide in the iodine solutions serves to adjust their pH to the proper acidity for maximum bactericidal action in addition to acting as a solvent for the iodine.

Solutions which are to be used as antiseptics should give up the active ingredient to the area of application readily, and this constituent should remain on that area for a prolonged period in intimate contact with it in order to assure a sterile surface during the time that the area is closing and healing. For this reason, it is desirable to use a solvent for the antiseptic agent which has a poor affinity for it, and, thus, will give it up readily. Aqueous solutions of triethanolamine hydriodide have this property when they are used to dissolve iodine.

A series of measurements was made upon various iodine solutions to determine the relative amounts of iodine that are adsorbed from them by silk fiber. The adsorption was measured because it serves to show the ease with which iodine can be removed from the solution by a tissue surface. The iodine was adsorbed onto silk fiber since silk fiber resembles the skin in that both are protein materials and this fiber offers a large surface per unit of weight.

Measurements of the amount of iodine adsorbed by silk fiber were made by the following method: Accurately weighed samples (0.3-0.4 gm.) of three-fiber silk thread which had previously been thoroughly scoured in hot soap solution to remove all oil and sizing, were immersed for thirty minutes in 250 cc. of the iodine solution being tested. The silk was then removed, pressed as dry as possible in a towel, then placed in a centrifuge for fifteen minutes, which rotated 1500 revolutions per minute. Such treatment removed the solvent and any iodine dissolved in it so that the iodine remaining was that which had been adsorbed by the silk. The silk sample containing adsorbed iodine was then immersed in 75.0 cc. of 0.01 normal sodium thiosulfate solution for four hours, after which time all the iodine had reacted with the thiosulfate. The excess sodium thiosulfate was titrated with 0.01 N iodine solution, and from this information the amount of iodine adsorbed per gram of silk was calculated.

As a result of adsorption studies using silk fiber, it was found that an aqueous iodine solution containing triethanolamine hydriodide gave up approximately four times as much iodine per gram of silk as did tincture of iodine, U. S. P. About 80% as much was adsorbed from this solution as from Lugol's solution, U. S. P., and Karn's solution containing 3 percent iodine allowed about the same amount of adsorption. However, for the same iodine content, adsorption from the triethanolamine hydriodide solution is considerably greater than those for the other solutions referred to. Addition of a surface-active agent to the solution under study somewhat diminished the iodine loss to the silk. The following Table V lists the results.

Table V

| Solution | Milligrams of iodine adsorbed per gram of silk |
|---|---|
| Tincture of iodine, U. S. P. (7% I) | 54 |
| Lugol's solution, U. S. P. (5% I) | 291 |
| Karn's solution, 3% I | 242 |
| Triethanolamine hydriodide-iodine (0.88% I) | 231 |
| Tincture of iodine, 0.88% I | 13 |
| Lugol's solution, 0.88% I | 118 |
| Karn's solution, 0.88% I | 135 |
| Triethanolamine hydriodide-iodine +0.5% Tergitol-4 | 198 |
| Same+0.2% Aerosol-OT | 173 |

The stability of iodine solutions in water containing triethanolamine hydriodide was tested by storing samples in clear glass, tightly stoppered bottles at room temperature and in diffused daylight for a period of three months. One sample originally containing 1.76 per cent of free iodine was unchanged in its free iodine content at the end of the storage period, while a second sample containing 1.01 per cent iodine was found to have 0.97 per cent iodine after storage. It has been concluded from these results that the solutions are sufficiently stable for all practical purposes.

The following example serves to illustrate the present preferred method of making triethanolamine hydriodide: Two hundred grams of triethanolamine are dissolved in one liter of ethyl alcohol and this solution is placed in a flask under a reflux condenser and heated on a steam bath. When the solution has reached its boiling point, 127 grams of iodine are added in 20-gram portions over a period of about two hours. When the iodine has all been used up, the reaction product is allowed to stand in a refrigerator for about 12 hours to allow crystallization. The triethanolamine hydriodide which separates is filtered off with suction, washed with acetone and dried at room temperature. Yield, about 260 grams. Melting point, 169-170° C. Other solvents may also be used, such as methyl alcohol, isopropyl alcohol, etc.

This compound may also be prepared in a similar manner by using water in place of alcohol as the solvent. However, this necessitates evaporation of the reaction product to recover the hydriodide and during this evaporation, discoloration occurs, making it necessary to purify the product by recrystallizing from alcohol, with a consequent reduction of yield.

Although in the above description, the characteristics and properties of aqueous iodine solutions in accordance with the invention have been set with particular reference to solutions employing triethanolamine hydriodide as the solubilizing agent, this is merely by way of example, it being understood that similar results may be obtained employing other of the alkylamine hydriodides referred to as the solubilizing agent.

In the general triethanolamine hydriodide or the hydriodides of other alkyl amines including the hydroxyalkyl amines previously described, may be prepared as follows: A weighted amount of the amine is dissolved in an equal volume of a suitable solvent such as water, ethyl alcohol, methyl alcohol or other similar liquids, and to it is added an equimolar amount of hydriodic acid of known strength. The solvent is evaporated until crystallization takes place or, as in the case of the hydriodides of monoethanolamine and diethanolamine, the solvent is completely removed. The crystalline solid or the residual liquid, as the case may be, is quite soluble in water and aqueous solutions of these materials have the property of dissolving appreciable quantities of iodine.

The following example illustrates the preparation of an aqueous solution of iodine containing triethanolamine hydriodide in accordance with the invention. 50 grams of triethanolamine are dissolved in enough distilled water to make a volume of 500 cc. and 4.5 grams of iodine are added. Upon shaking, the iodine liquefies, then dissolves if vigorous shaking is continued. When solution of the iodine is complete, 0.1 to 1% of a water-soluble surface-active agent, such as those above referred to, may be added. The solution thus obtained has the properties described.

The iodine content may be varied by a corresponding variation in the amount of triethanolamine hydriodide present. The limit of iodine content is governed by the limit of solubility of the hydriodide in water which is somewhat above 30 percent or 0.1083 mole percent. At a 30 percent triethanolamine hydriodide concentration, the limit of iodine solubility is about 4 percent, or 0.0157 mole percent.

Therefore, in accordance with the invention, an aqueous solution of iodine has been developed which makes use for the first time, of the solubilizing action of alkyl amine hydriodides as aforesaid for dissolving iodine in water. By incorporating a small quantity of a surface-active agent in the solution, the surface tension has been greatly reduced, thereby giving a product which penetrates small openings, such as skin pores, with the same ease as does an alcoholic solution, such as Tincture of Iodine, U. S. P. Even though iodine is made to dissolve in these aqueous solutions containing alkyl amine hydriodides, the solvent has a poor affinity for the iodine and gives it up to solid surfaces by adsorption very readily. Because of this fact, these solutions, which contain relatively small amounts of free iodine in comparison with iodine solutions in common use, will deposit as much or more iodine on the skin when applied and thus will produce just as high a germicidal action as the more concentrated solutions. Because of the absence of any great excess of free iodine, these new solutions are less irritating and corrosive than those containing larger amounts of iodine. Due to the inherent properties of triethanolamine hydriodide when dissolved in water, the pH of iodine solutions prepared in this solvent is somewhat on the acid side, a desirable property since antiseptic solutions are known to exert their maximum efficiency when the pH is 4 or below. This acidity is not great enough to impart any increase in the irritating properties of the solutions. The solutions are sufficiently stable to be used for all practical purposes.

We claim:
1. An antiseptic, aqueous solution of iodine containing an alkylamine hydriodide as a solubilizing agent.

2. An antiseptic, aqueous solution of iodine containing as a solubilizing agent, an alkylamine hydriodide having two to six carbon atoms in the alkyl groups.

3. An antiseptic, aqueous solution of iodine containing as a solubilizing agent, a hydroxyalkyl amine hydriodide having two to six carbon atoms in the alkyl groups.

4. An antiseptic, aqueous solution of iodine containing triethanolamine hydriodide as a solubilizing agent.

5. An antiseptic, aqueous solution of iodine containing as a solubilizing agent, the dihydriodide of ethylene diamine.

6. An antiseptic, aqueous solution of iodine containing about 0.0024 to 0.0157 mol per cent of iodine and about 0.007 to 0.108 mol per cent triethanolamine hydriodide.

7. A process for producing a hydroxyalkylamine hydriodide, which comprises, dissolving a hydroxyalkyl amine in a solvent of the group consisting of alcohol and water, refluxing with the addition of iodine, and isolating the reaction product.

8. A process for producing triethanolamine hydriodide, which comprises, dissolving triethanolamine with alcohol, in proportions of about 200 grams of triethanolamine to about one liter of alcohol, refluxing for about two hours with the gradual addition of iodine in proportion of about 127 grams in aggregate, cooling to crystallize the reaction product, and isolating said product.

ROBB V. RICE.
GEORGE D. BEAL.